United States Patent

[11] 3,568,019

| [72] | Inventors | Yoichi Hirokawa<br>Kanagawa-ken;<br>Isao Masuzawa, Tokyo, Japan |
|---|---|---|
| [21] | Appl. No. | 786,563 |
| [22] | Filed | Dec. 24, 1968 |
| [45] | Patented | Mar. 2, 1971 |
| [73] | Assignee | Kabushikikaisha Tokyo Keiki Seizosho<br>Tokyo, Japan |
| [32] | Priority | Dec. 30, 1967 |
| [33] | | Japan |
| [31] | | 42/85200,42/85201,42/80202,42/110991-V.M. |

[54] CIRCUIT FOR BRAKING AND DRIVING AN AC MOTOR IN THE FORWARD AND REVERSE DIRECTION UTILIZING SEMICONDUCTOR ELEMENTS
8 Claims, 15 Drawing Figs.

[52] U.S. Cl............................................. 318/203,
318/207, 318/212, 318/227
[51] Int. Cl....................................................... H02p 1/40

[50] Field of Search............................................318/20.411,
203, 207, 212, 225, 227, 345

[56] References Cited
UNITED STATES PATENTS

| 2,546,555 | 3/1951 | Meredith et al. | 318/207X |
| 3,237,070 | 2/1966 | Inaba et al. | 318/227X |
| 3,353,077 | 11/1967 | Egglestone et al. | 318/227X |
| 3,421,063 | 1/1969 | Reinke | 318/227X |
| 3,424,959 | 1/1969 | Gruner | 318/20.411 |

Primary Examiner—Benjamin Dobeck
Assistant Examiner—Gene Z. Rubinson
Attorney—Hill, Sherman, Meroni, Gross and Simpson ABSTRACT: A controlling circuit for an AC motor having an AC motor, an AC electric power source for driving said AC motor, AC controlling elements connected between said AC power source and AC motor, a switching element connected between said AC motor and AC power source, a first means for detecting a condition of said AC controlling elements, and a second means for controlling said switching element in accordance with the result detected by said first means.

INVENTORS
Yoichi Hirokawa
Isao Masuzawa

INVENTORS
Yoichi Hirokawa
Isao Masuzawa

INVENTORS
Yoichi Hirokawa
Isao Masuzawa 3,568,019

CIRCUIT FOR BRAKING AND DRIVING AN AC MOTOR IN THE FORWARD AND REVERSE DIRECTION UTILIZING SEMICONDUCTOR ELEMENTS

BACKGROUND OF THE INVENTION

1. Field of the Invention

The present invention relates to a motor controlling circuit, more particularly to an AC motor controlling circuit.

2. Description of the Prior Art

A conventional motor controlling device has employed a relay having mechanical contacts. Accordingly, the conventional motor controlling device cannot be free from the disadvantage that the expected life span and the reliability of the controlling device are deteriorated due to wear of the mechanical contacts and that an additional explosion-proof device must be provided for protecting the controlling device from the explosion and/or from the fire due to the spark discharge between the contacts, and the controlling device is only placed on a limited position for the same reason and further regular checking of the contacts and repair of abraded contacts must be required.

The conventional motor controlling device has a further disadvantage that the response time of the contact mechanism of the mechanical relay employed in the controlling device cannot be negligible small with respect to the time constant of a controlled motor.

SUMMARY OF THE INVENTION

An object of the present invention is to provide an AC motor controlling circuit of short response time, the AC motor being used in remote control or automatic control system, which can be used for driving the AC motor reversibly as well as for driving or stopping the motor immediately.

Another object of the present invention is to provide an AC motor controlling circuit which can control the AC motor with accuracy and high reliability.

Another object of the present invention is to provide an AC motor controlling circuit which is free from maintenance.

Still another object of the present invention is to provide an AC motor controlling circuit simple in construction and small in size.

Other objects, features and advantages of the present invention will be clearly understood from the following description taken in conjunction with the accompanying drawings through which similar reference numerals designate similar components.

DESCRIPTION OF THE PREFERRED EMBODIMENTS

Before entering the detailed explanation of the present invention, one example of conventional two-phase motor controlling devices is explained hereinbelow with reference to FIG. 1.

Figure 1:
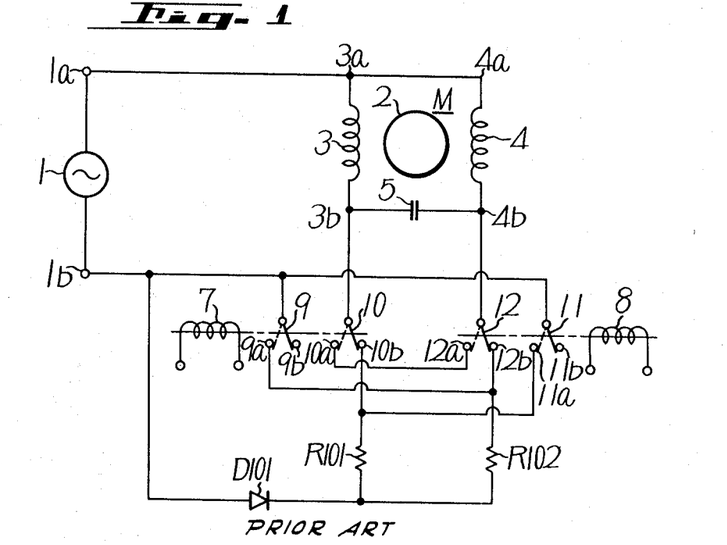
FIG. 1 is a schematic diagram illustrating a conventional AC two-phase motor controlling device employing mechanical relays.

In FIG. 1, reference numerals 7 and 8 respectively designate relays. When the relay 8 is energized, movable contacts 11 and 12 of the relay 8 are respectively contacted with fixed contacts 11a and 12a as shown in FIG. 1 by dotted lines. When the contact 11 contacts with the contact 11a and the contact 12 contacts with the contact 12a, a circuit of an AC electric power source 1—a winding 3 of an AC motor M—a movable contact 10 of the relay 7—a fixed contact 10b—the fixed contact 11a—the movable contact 11—the AC electric power source 1 and a circuit of the AC power source 1—a winding 4 of the motor M—a capacitor 5—the movable contact 10—the fixed contact 10b—the fixed contact 11a—the movable contact 11—the power source 1 are respectively closed. Accordingly, the motor M is rotated in one direction. In this case, the condensive capacitor 5 acts to generate the phase difference of 90° between the currents passing through the windings 3 and 4 of the motor M. When the relay 8 is deenergized, the movable contacts 11 and 12 of the relay 8 return to fixed contacts 11b and 12b as shown in FIG. 1 by solid lines to open the above two closed circuits and to close a circuit of the power source 1—a diode D101—a resistor R101—the contact 10b—the contact 10—the winding 3—the power source 1 and a circuit of the power source 1—the diode D101—a resistor R102—the contact 12b—the contact 12—the winding 4—the power source 1. Accordingly, upon deenergization of the relay 8 the windings 3 and 4 of the motor M are simultaneously energized with direct current to apply braking to a rotor 2 of the motor M. In the example shown in FIG. 1 the circuit including the relay 8 is symmetrical with that of the circuit including the relay 7 with respect to the rotor 2 so that when the relay 7 is energized the rotor 2 is revolved in the opposite direction to that of the rotor 2 upon energization of the relay 8.

The conventional motor controlling device including the mechanical relays has the disadvantages set forth above.

One example of noncontact type AC motor controlling circuits of the present invention free from the drawbacks encountered in the conventional device will be explained with reference to FIG. 2.

Figure 2:
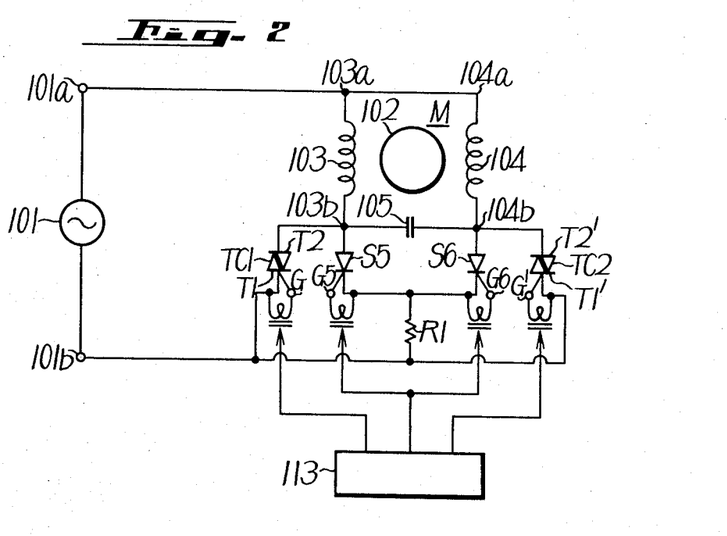
FIG. 2 is a schematic diagram illustrating one example of AC motor controlling circuits of the present invention.

In FIG. 2, reference numeral 101 designates an AC electric power source and reference character M a two-phase motor having windings 103, 104 and a rotor 102. Ends 103a, 104a of the windings 103, 104 are connected to one terminal 101a of the power source 101 and the other ends 103b, 104b of the windings are respectively connected to second anodes T2 and T2' of noncontact type AC controlling elements such, for example, as bidirectional triode thyristors TC1 and TC2. First anodes T1 and T1' of the thyristors TC1 and TC2 are connected to the other terminal 101b of the power source 101. A capacitor 105 is inserted between the terminals 103b and 104b of the windings 103 and 104 of the motor M. A DC braking circuit consisting of noncontact type switching elements S5 and S6 such, for example, as reverse blocking triode thyristors and a resistor R1 is connected between the terminal 101b of the power source 101 and the windings of the motor M. That is, an anode of the thyristor S5 is connected to the end 103b, an anode of the thyristor S6 is connected to the end 104b, cathode of the thyristors S5 and S6 are together connected to one end of the resistor R1 and the other end of the resistor R1 is connected to the terminal 101b. In this case the resistor R1 is used for controlling DC current supplied to the windings of the motor M. A signal generating circuit indicated at 113 is used for supplying a signal to either one of gates G and G' of the thyristors TC1 and TC2 to make one of the thyristors TC1 and TC2 conductive. When one of the thyristors, for example, TC1 is made conductive, a circuit consisting of the power source 101—the winding 103—the thyristor TC1—the power source 101 and a circuit consisting of the power source 101—the winding 104—the capacitor 105—the thyristor TC1—the power source 101 are respectively closed to rotate a rotor 102 of the motor M into one direction. On the contrary, when the TC2 is made conductive, a circuit of the power source 101—the winding 103—the capacitor 105—the thyristor TC2—the power source 101 and a circuit of the power source 101—the winding 104—the thyristor TC2—the power source 101 are respectively closed so that the rotor 102 of the motor M is rotated to the other opposite direction.

When the thyristors TC1 and TC2 are both nonconductive, namely no signal is supplied to either of the gates G and G' of the thyristors TC1 and TC2 from the signal generating circuit 113, signals are respectively applied to gates G5 and G6 of the thyristors S5 and S6 to make the thyristors S5 and S6 conductive. In this case a circuit consisting of the power source 101—the winding 103—the thyristor S5—the resistor R1—the power source 101 and a circuit of the power source 101—the winding 104—the thyristor S6—the resistor R1—the power source 101 are respectively closed so that rectified currents respectively pass through the above two closed circuits to apply braking force to the motor M for instantaneously stopping the rotation of the rotor 102.

Figure 3:
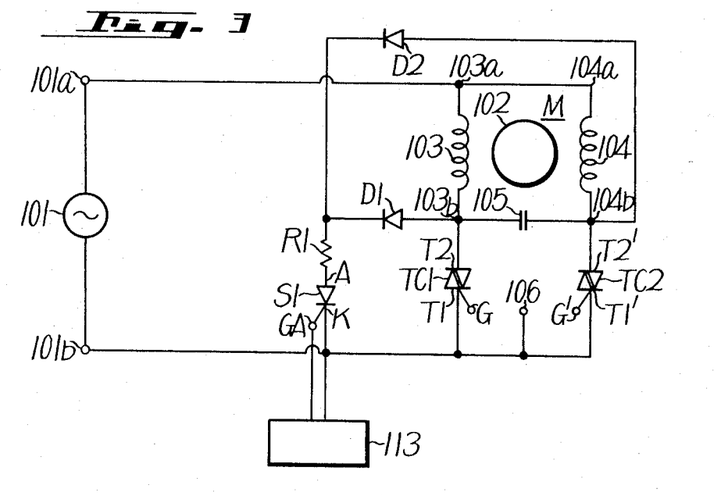
FIG. 3 is a schematic diagram showing another example of the present invention.

FIG. 3 shows another example of the present invention in which reference numerals similar to those of FIG. 2 designate similar elements. In the example shown in FIG. 3 only one reverse blocking triode thyristor S1 is used instead of two reverse blocking triode thyristors S5 and S6 used in FIG. 2.

The example shown in FIG. 3 is hereinbelow explained in detail. An anode of a diode D1 is connected to the end 103b of the winding 103 and an anode of a diode D2 is connected to the end 104b of the winding 104. The cathodes of the diodes D1 and D2 are together connected to an anode A of the thyristor S1 through the resistor R1. A cathode K of the thyristor S1 is connected to the terminal 101b of the power source 101. In this case, it is, of course, possible to change the polarity of the thyristor S1, the diodes D1 and D2 reverse to that shown in FIG. 3. The other elements of this example are connected with one another as those in the example of FIG. 2.

With the example as shown in FIG. 3, when the signal is fed between the gate of the thyristor and a terminal 106, for example, between the gate G of the bidirectional triode thyristor TC1 and the terminal 106 to make the thyristor TC1 conductive, a circuit consisting of the power source 101—the winding 103—the thyristor TC1—the power source 101 and a circuit consisting of the power source 101—the winding 104—the capacitor 105—the thyristor TC1—the power source 101 are respectively closed. Accordingly AC voltage is fed across the winding 103 included in the first-mentioned closed circuit and AC voltage phase-advanced by the capacitor 105 is fed across the winding 104 included in the second-mentioned closed circuit so that the motor M is driven in one direction. When no signal is fed between the gate G and the terminal 106, namely the thyristor TC1 becomes nonconductive and a signal is applied between a gate G' of the other bidirectional triode thyristor TC2 and the terminal 106 to make the thyristor TC2 conductive, a circuit consisting of the power source 101—the winding 104—the thyristor TC2—the power source 101 and a circuit consisting of the power source 101—the winding 103—the capacitor 105—the thyristor TC2—the power source 101 are respectively closed. In this case AC voltage is fed across the winding 104 included in first-mentioned circuit and AC voltage phase-advanced by the capacitor 105 is fed across the winding 103, so that the motor M is driven in the opposite direction. In the case where both of the bidirectional triode thyristors TC1 and TC2 are nonconductive, a signal is supplied between the cathode K and a gate GA of the reverse blocking triode thyristor S1 to make it conductive from the braking signal generating circuit 113. In this case, a circuit consisting of the power source 101—the winding 103—the diode D1—the resistor R1—the thyristor S1—the power source 101 and a circuit consisting of the power source 101—the winding 104—the diode D2—the resistor R1—the thyristor S1—the power source 101 are respectively closed. Accordingly, direct currents (pulsating direct currents) of same phase are supplied to the windings 103 and 104 respectively to stop the rotation of the rotor 102 of the motor M. When either one of the bidirectional triode thyristors TC1 and TC2 is made conductive, the braking signal generating circuit 113 at once stops to supply the signal to the gate GA of the reverse blocking triode thyristor S1, to thereby make it nonconductive, that is, the braking circuits including the thyristor S1 set forth above are both opened instantaneously and the motor M is driven in the manner as set forth above.

According to the present invention explained above, when the motor M is driven by alternating currents no direct current is supplied to the motor for braking the motor and when the alternating current to the motor is stopped the direct current is at once supplied to the motor to immediately stop the rotation of the motor to maintain that state until the motor will driven.

Figure 4:
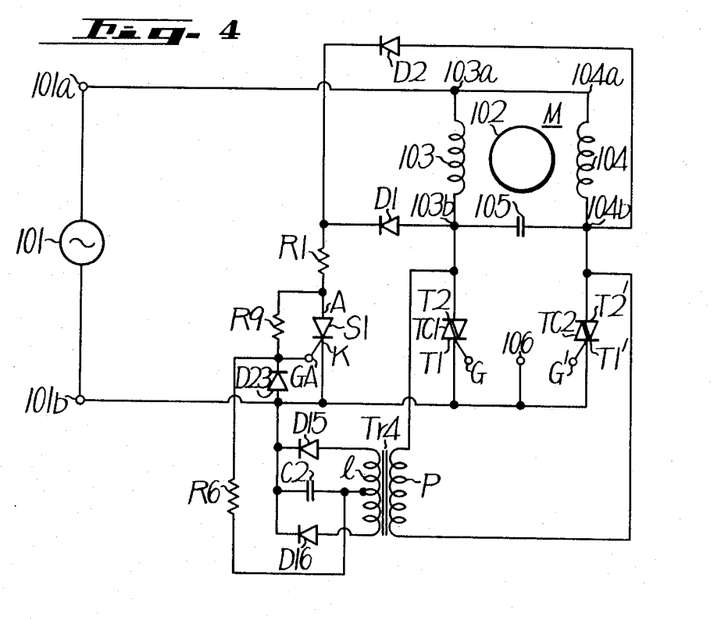
FIGS. 4 to 14, inclusive, are connection diagrams respectively showing other examples of the present invention.

FIG. 4 is another example of the present invention, which is substantially similar to that shown in FIG. 3 except the fact that one embodiment of the braking signal generating circuit 113 is practically illustrated so that similar components are shown with the same reference numerals and their detailed explanation are deleted for the sake of simplicity. G In the example shown in FIG. 4, a primary winding P of a transformer Tr4 is connected between the ends 103b and 104b in parallel with the capacitor 105. Anodes of diodes D15 and D16 are respectively connected to ends of a secondary winding l of the transformer Tr4 and cathodes of the diodes D15 and D16 are together connected to the cathode K of the reverse blocking triode thyristor S1 and to an anode of a diode D23. A capacitor C2 is inserted between the connection point of the cathodes of the diodes D15 and D16 and the secondary winding l. Between the cathode of the diode D23 and the connection point of the capacitor C2 and the secondary winding l a resistor R6 is inserted and between the cathodes of the diode D23 and the anode A of the reverse blocking triode thyristor S1 a resistor R9 is inserted. The gate GA of the thyristor S1 is connected to the cathode of the diode D23.

With this example explained above, when either of the bidirectional triodes thyristors TC1 and TC2 is made conductive, the motor M is driven in one direction as apparent from the explanation made in connection with the foregoing examples. In this case, namely the motor being driven, AC voltage appears across the capacitor 105 so that AC voltage is generated across the secondary winding l of the transformer Tr4. Due to the AC voltage appearing across the secondary winding l direct current flows through the circuit including the resistor R6 and the diode D23 so that the diode D23 is biased in the forward direction to thereby bias the reverse blocking triode thyristor S1 enough in the backward direction. As a result of this no current can be applied to the gate GA of the thyristor S1 to maintained it nonconductive. When the signal applied to the gate G of the bidirectional triode thyristor TC1 or to the gate G' of the bidirectional triode thyristor TC2 disappears to make it nonconductive, the AC voltage appeared across the capacitor 105 also disappears with the result that the AC voltage generated across the secondary winding l of the transformer Tr4 disappears and no current flows through the diode D23. The bias applied to the gate GA of the reverse blocking triode thyristor S1 disappears accordingly so that when the terminal 101a of the power source 101 is positive a current is applied through the resistor R9 to the gate GA of the thyristor S1 to make it conductive with the result that the motor M is immediately stopped and held in its stopped condition as set forth above.

Figure 5:
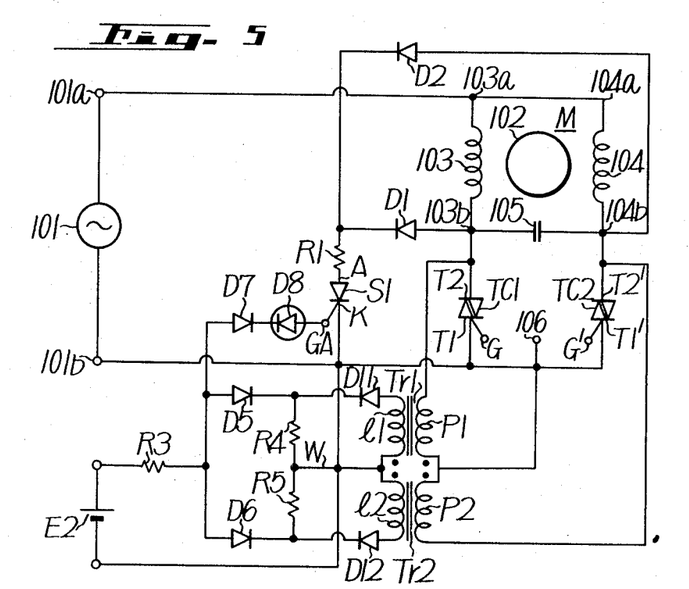

FIG. 5 shows another example of the present invention, in which similar numerals to those used in FIGS. 3 and 4 designate similar components and their operations are substantially same one another so that their detailed explanation is omitted for the sake of simplicity.

In the example shown in FIG. 5, two transformers Tr1 and Tr2 are employed instead of the single transformer Tr4 in FIG. 4. Primary windings P1 and P2 of the transformers Tr1 and Tr2 are connected between the ends 103b and 104b in series with each other and secondary windings l1 and l2 of the transformers Tr1 and Tr2 are connected in series with each other. The connection point of first anodes T1 and T1' of the bidirectional triode thyristors TC1 and TC2 and the connection point of the primary windings P1 and P2 are connected. An anode of a diode D11 is connected to the free end of the output (secondary) winding l1 of the transformer Tr1 and an anode of a diode D12 is connected to the free end of the output (secondary) winding l2 of the transformer Tr2. The cathode of the diode D11 is connected to a cathode of a diode D5 and the cathode of the diode D12 is connected to a cathode of a diode D6. The anodes of the diodes D5 and D6 are connected together. To the connection point of the anodes of the diodes D5 and D6 a positive electrode of a DC electric power source E2 is connected through a resistor R3. Resistors R4 and R5 connected in series are inserted between the connection point of the diodes D11 and D5 and the connection point of the diodes D12 and D6. The connection point of the resistors R4 and R5 is connected to the connection point of the output windings $l1$ and $l2$ of the transformers Tr1 and Tr2 by means of a lead wire W. The negative electrode of the DC electric power source E2 is connected to the cathode K of the reverse blocking triode thyristor S1 passing through the lead wire W. The connection point of the resistor R3 and the anodes of the diodes D5 and D6 is connected to the gate GA of the thyristor S1 through a series connection of a diode D7 and a Zener diode D8 which are connected in the opposite polarities. In this case it is, of course, possible to connect the diodes D5, D6 D11 and D12 from those explained above and shown in the figure. The other construction of the embodiment shown in FIG. 5 is similar to those shown in FIGS. 3 and 4.

The operation of the example shown in FIG. 5 is explained below. When a signal is applied between the gate, for example, G of the bidirectional triode thyristor TC1 and the terminal 106 to make the thyristor TC1 conductive, a circuit consisting of the power source 101—the winding 103—the thyristor TC1—the power source 101 and a circuit consisting of the power source 101—the winding 104—the capacitor 105—the thyristor TC1—the power source 101 are respectively closed. Accordingly, the motor M is driven in one direction as set forth above. Meanwhile when the thyristor TC1 is made nonconductive, voltage appears across the electrodes T1 and T2 to produce voltage in the output windings $l1$ of the transformer Tr1 the primary winding P1 of which is connected between the electrodes T1 and T2. In this case, between the electrodes T1' and T2' of the thyristor TC2 voltage the phase of which is same to that of the voltage appeared across the electrodes T1 and T2 appears because the thyristor TC2 is nonconductive. Therefore, voltage is also generated in the output winding $l2$ of the transformer Tr2 the primary winding P2 of which is inserted between the electrodes T1' and T2'. Due to the outputs of the transformers Tr1 and Tr2, a current flows through the closed circuit of, for example, the diode D12—the resistor R5—the winding $l2$ so that current passing through the closed circuit of the power source E2—the resistor R3—the diode D6—the resistor R5—the power source E2 is somewhat prevented during some phase angle of the output voltages of the transformers by the voltage drop of the resistor R5. Similarly, the current passing through the closed circuit of the winding $l1$—the diode D11—the resistor R4— the winding $l1$ prevents during some phase angle the current from flowing through the closed circuit of the power source E2—the resistor R3—the diode D5—the resistor R4—the power source E2. As a result of this, current passes through the closed circuit consisting of the power source E2—the resistor R3—the diode D7—the Zener diode D8—the gate GA of the reverse blocking triode thyristor S1—the cathode K of the thyristor S1—the power source E2 during the above phase angle to make the thyristor S1 conductive. In this case, the Zener diode D8 operates to make the thyristor S1 nonconductive when no voltages appear in the output windings $l1$ and $l2$. When the thyristor S1 is made conductive the circuits consisting of the AC power source 101—the winding 103—the diode D1—the resistor R1—the thyristor S1—the power source 101 and the power source 101—the winding 104—the diode D2—the resistor R1—the thyristor S1—the power source 101 are respectively closed so that direct pulsating currents in same phase pass through the closed circuits respectively to stop the rotor 102 of the motor M. Thus, when both the bidirectional triode thyristors TC1 and TC2 are nonconductive the reverse blocking triode thyristor S1 is immediately made conductive to stop the motor at once.

When the bidirectional triode thyristor TC1 is made conductive again, no voltage is produced in the output winding $l1$ of the transformer Tr1 with the result that the diode D5 is made conductive by the DC power source E2. Therefore, the potential value of the anode of the diode D5 becomes lower than the operating potential of the Zener diode D8 so that the Zener diode D8 is held nonconductive and the reverse blocking diode triode thyristor S1 is not made conductive. As a result of this, the circuits for driving the motor are closed to rotate the rotor 102 of the motor as set forth above and no braking force is applied to the rotor because the circuits for supplying the direct current to the motor are opened.

If the bidirectional triode thyristor TC2 is made conductive with the thyristor TC1 being nonconductive, the motor is driven in the counter direction to that when the thyristor TC1 is conductive as in the case of the foregoing.

As shown in FIG. 5, the transformers Tr1 and Tr2 are respectively connected between the electrodes T1, T2 and T1', T2' of the bidirectional triode thyristors TC1 and TC2 to form the circuits of the power source 101—the winding 103—the transformer Tr1—the power source 101 and the power source 101—the winding 104—the transformer Tr2—the power source 101. Influence on the driving characteristics of the motor when being driven and on the braking characteristics of the motor when being stopped due to the fact that the above two circuits are always connected to the AC electric power source can be practically neglected by employing high impedance transformers.

Figure 6:
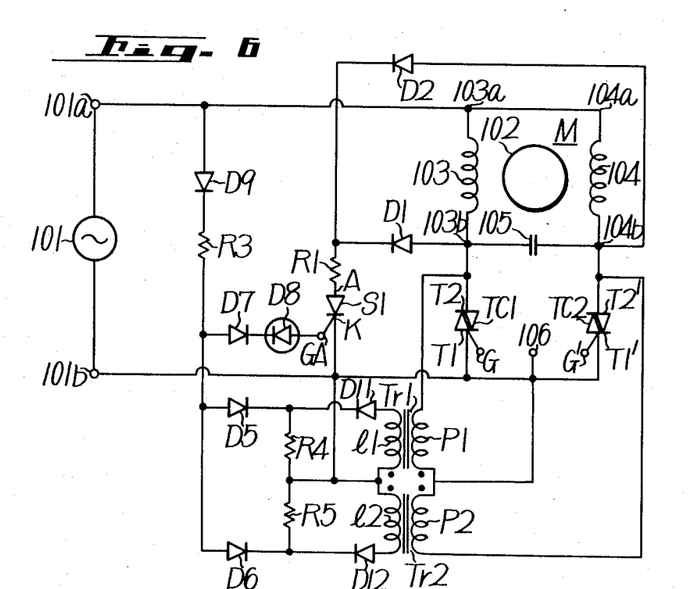

The example shown in FIG. 6 is similar to that depicted in FIG. 5 except that a direct current power is obtained by rectifying the AC output of the AC power source 101 by means of a diode D9 instead of the DC power source E2 in FIG. 5. That is, the anode of the diode D9 is connected to, for example, the terminal 101a of the AC power source 101 and the cathode of the diode D9 is connected to the anodes of the diodes D7, D5 and D6 respectively through the resistor R3. The other elements, the connection thereof and their operation of this example are substantially the same as those of the example shown in FIG. 5 so that their detailed explanation is omitted for the sake of simplicity by only showing the elements with the same references to those of the example in FIG. 5.

Figure 7:
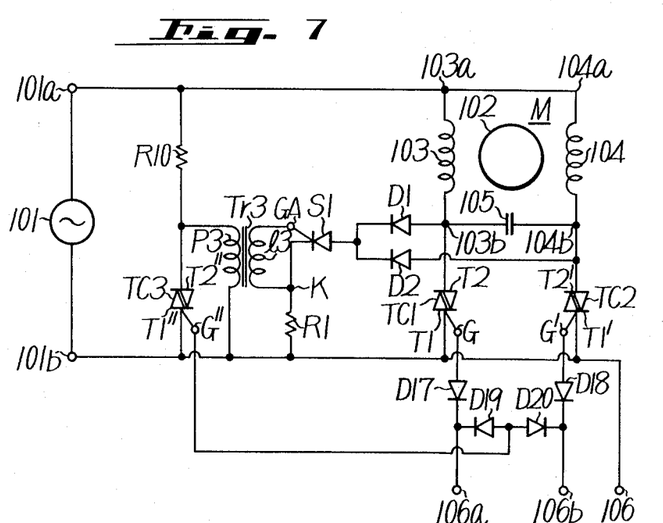

FIG. 7 is another example of the present invention the main difference of which, as compared with the foregoing examples, resides in the braking signal generating circuit. That is, means are provided for giving a logic characteristic to the gate of each thyristor. The example shown in the FIG. 7 will be hereinbelow explained in detail. A series circuit of a resistor R10 and a bidirectional triode thyristor TC3 is inserted between the terminals 101a and 101b of the AC electric power source 101. Between first and second anodes T1'' and T2'' of the thyristor TC3 a primary winding P3 of a transformer Tr3 is inserted. A secondary winding $l3$ of the transformer Tr3 is connected between the cathode K and the gate GA of the reverse blocking triode thyristor S1. The resistor R1 is inserted between the terminal 101b of the power source 101 and the cathode K of the thyristor S1, if necessary. To the gate G of the bidirectional triode thyristor TC1 an anode of a diode D17 is connected and an anode of a diode D18 is connected to the gate G' of the bidirectional triode thyristor TC2. Between the cathodes of the diodes D17 and D18 is a series circuit of diodes D19 and D20 is connected in opposite polarities, namely the cathode of the diode D19 is connected to the cathode of the diode D17, the cathode of the diode D20 is connected to the cathode of the diode D18 and the anodes of the diodes D19 and D20 are connected with each other. The connection point of the diodes D19 and D20 is connected to a gate G'' of the thyristor TC3. The connection points of the diodes D17, D19 and the diodes D18, D20 respectively make terminals 106a and 106b, so that the terminal 106a is connected to the gate G of the thyristor TC1 through the diode D17 and also to the gate G'' of the thyristor TC3 through the diode D19 and that the terminal 106b is connected to the gate G' of the thyristor TC2 through the diode D18 and also to the gate G'' of the thyristor TC3 through the diode D20. In this case, the gate signal for the thyristor TC1 or TC2 is applied between the terminals 106 and 106a or 106 and 106b.

When no signal is applied between the terminals 106 and 106a and 106 and 106b, the three bidirectional thyristors TC1, TC2 and TC3 are all maintained to be nonconductive so that the AC voltage is fed from the AC power source 101 across the primary winding P3 of the transformer Tr3 through the resistor R10. In this case, the reverse blocking triode thyristor S1 is made conductive because the trigger voltage is applied to the gate GA of the thyristor S1 by the voltage excited in the secondary winding l3 of the transformer Tr3. When the thyristor S1 is made conductive, the circuits consisting of the power source 101—the winding 103—the diode D1—the thyristor S1—the resistor R1—the power source 101 and the power source 101—the winding 104—the diode D2—the thyristor S1—the resistor R1—the power source 101 are respectively closed during the time when the terminal 101a is positive, to thereby apply braking force to the motor M and maintain the motor M at stopped state as explained in connection with the foregoing examples.

As mentioned above the logical circuit consisting of the diodes D17 to D20 is inserted in the gate circuits of the bidirectional triode thyristors TC1, TC2 and TC3. The operation of the logical circuit is that when either one of the thyristors TC1 and TC2 is made conductive the thyristor TC3 is made conductive without failure. That is, if between the terminals, for example, 106 and 106b a signal is applied, the terminal 106a being negative, the signal is applied to the gate G″ of the thyristor TC3 through the circuit of the terminal 106—the electrode T1″ of the thyristor TC3—the gate G″ thereof—the diode D19—the terminal 106a to make the thyristor TC3 conductive so that the primary winding P3 of the transformer Tr3 is short circuited. As a result of this no voltage appears across the secondary winding l3 of the transformer Tr3 so that any current is not applied to the gate GA of the reverse blocking thyristor S1. Accordingly, the thyristor S1 is made nonconductive to thereby prevent the braking current from passing through the windings 103 and 104 of the motor M. Meanwhile, the trigger signal applied between the terminals 106 and 106a also flows through the circuit consisting of the terminal 106—the first electrode T1 of the thyristor TC1—the gate G thereof—the diode D17—the terminal 106a to make the thyristor TC1 conductive so that the alternating currents are applied to the windings 103 and 104 of the motor M to rotate it in one direction. When no signal is applied between the terminals 106 and 106a, the thyristor TC1 becomes nonconductive to open the circuits for supplying the alternating currents to the motor M and the thyristor TC3 is immediately made nonconductive so that the AC voltage is applied across the primary winding P3 of the transformer Tr3. As a result of this, the reverse blocking triode thyristor S1 is made conductive by the voltage generated in the secondary winding l3 of the transformer Tr3 and immediately the braking force is applied to the motor to stop it.

The bidirectional triode thyristors TC1 and TC2 are symmetrical with respect to the motor M as in the foregoing examples so that when a signal is impressed between the terminals 106 and 106b and the thyristor TC2 is made conductive, the motor M is driven in the counter direction as in the foregoing examples. In this case, the thyristor TC3 is made nonconductive by the current passing through the closed circuit consisting of the terminal 106—the electrode T1″ of the thyristor TC3—the gate G″ thereof—the diode D20—the terminal 106b to immediately open the braking circuit.

Figure 8:
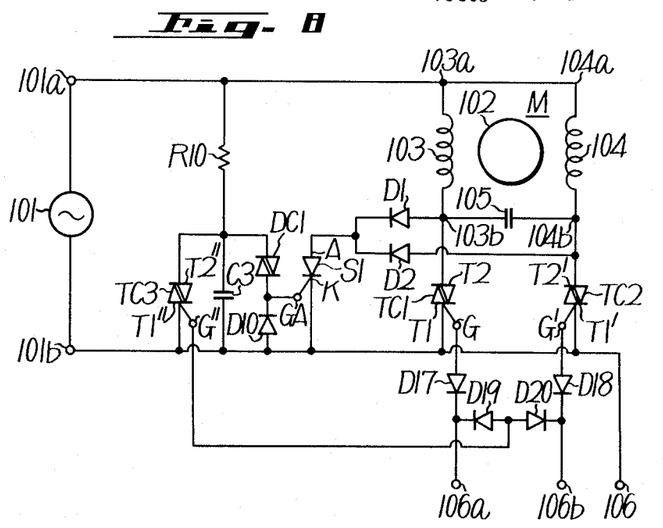

FIG. 8 shows still another example of the present invention in which similar references to those of FIG. 7 designate the similar elements and their operations are substantially same with one another.

The main difference between the examples shown in FIGS. 7 and 8 is that in this example a capacitor C3 is inserted between the electrode T2″ of the bidirectional triode thyristor TC3 and the terminal 101b of the power source 101 instead of the transformer Tr3 employed in the example shown in FIG. 7, a diode D10 is inserted between the gate GA of the reverse blocking triode thyristor S1 and the terminal 101b of the power source 101 and that a trigger diode DC1 (which is called "BIAC, or DIAC diode") is inserted between the connection point of the diode D10 and the gate GA of the thyristor S1 and the connection point of the capacitor C3 and the resistor R10.

With the example shown in FIG. 8, when no signal is applied between the terminals 106 and 106a and between the terminals 106 and 106b, all the bidirectional triode thyristors TC1, TC2 and TC3 are maintained to be nonconductive. In this case, the capacitor C3 is charged by the AC electric power source 101 through the resistor R10. In such a condition, if the terminal 101a is positive the capacitor C3 is charged. When the voltage of the capacitor C3 exceeds the breakover voltage of the trigger diode DC1, the electric charge stored in the capacitor C3 is discharged through the closed circuit of the capacitor C3—the trigger diode DC1—the gate GA of the thyristor S1—the cathode K thereof—the capacitor C3 to make the thyristor S1 conductive. As a result of this the motor M is at once subjected to the braking force as in the foregoing examples. In this case, it is possible by suitably adjusting the time constant determined by the resistor R10 and the capacitor C3 to adequately control the conduction angle of the reverse blocking triode thyristor S1 and to adjust the value of the DC braking current applied to the motor. Accordingly, in this example, the resistor R1 employed in the example of FIG. 7 is dispensed with.

It is very remarkable advantage of this example that the resistor R1 for limiting the direct current passing through the windings of the motor is dispensed with, because the power consumption of the resistor R1 and the heat generated in the resistor R1 due to the current passing therethrough are generally of great value.

Meanwhile, when the terminal 101b of the power source 101 is positive with the bidirectional triode thyristors being nonconductive and the voltage of the electric charge stored in the capacitor C3 exceeds the breakover voltage of the trigger diode DC1, the stored electric charge in the capacitor C3 is discharged through the circuit of the capacitor C3—the diode D10—the trigger diode DC1.

When a signal is applied between the terminals 106 and 106a or between the terminals 106 and 106b, the bidirectional triode thyristor TC3 is made conductive as in the case of the example shown in FIG. 7 to short circuit the capacitor C3 with a result that the reverse blocking triode thyristor S1 is made nonconductive and the bidirectional triode thyristor TC1 or TC2 is made conductive to drive the motor.

Figure 9:
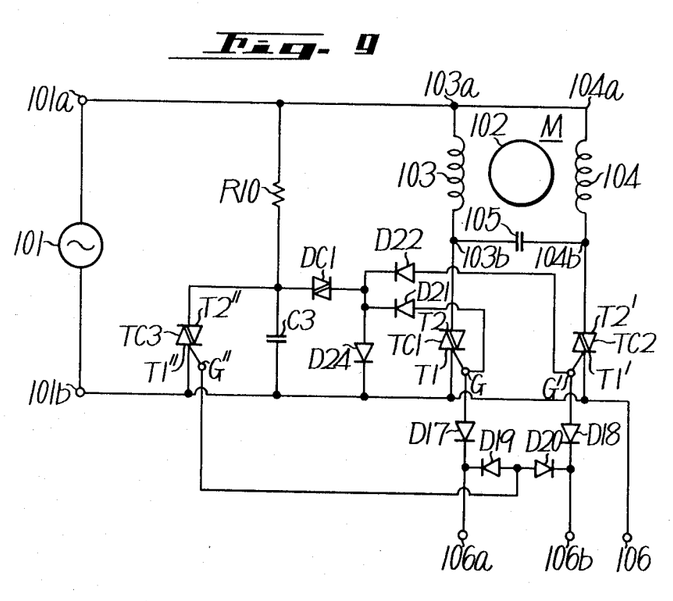

FIG. 9 is a still further example of the present invention in which reference numerals similar to those of the example shown in depicted in FIG. 8 represent similar elements and their operations are substantially same.

In this example the diodes D1, D2 and D10 and further the reverse blocking triode thyristor S1 used in the example shown in FIG. 8 are dispensed with and a diode D24 is inserted between the terminal 101b of the power source 101 and one of the electrodes of the trigger diode DC1. Further, in this case between the connection point of the trigger diode DC1, the diode D24 and the gate G of the bidirectional triode thyristor TC1 and between the above connection point and the gate G′ of the bidirectional triode thyristor TC2 diodes D21 and D22 are respectively inserted. The other elements, their connections and their operations of this example are similar to those of the example shown in FIG. 8 as set forth above.

The operation of this example will be explained. If no signal is applied between the terminals 106 and 106a and between the terminals 106 and 106b, the bidirectional triode thyristor TC3 is kept nonconductive as in the cases of the examples of FIGS. 7 and 8. In this condition when the terminal 101b of the power source 101 is positive and the voltage of the electric charge stored in the capacitor C3 exceeds the breakover voltage of the trigger diode DC1, the charge stored in the capacitor C3 is discharged through the circuits of the capacitor C3—

—the electrode T1 of the thyristor TC1—the gate G thereof—the diode D21—the trigger diode DC1—the capacitor C3 and the capacitor C3—the electrode T1' of the thyristor TC2—the gate G' thereof—the diode D22—the trigger diode DC1—the capacitor C3 respectively. Meanwhile, when the terminal 101b of the power source 101 is positive the direct current is applied to the windings 103 and 104 of the motor M to stop it. In this case the conduction angle of the bidirectional triode thyristors TC1 and TC2 is controlled by adjusting the discharging time constant determined by the capacitor C3 and the resistor R10 to control the braking direct current passing through the windings 103 and 104 of the motor M. The current discharged through the trigger diode DC1 is cut off by the diodes D17 and D18 so that the bidirectional triode thyristor TC3 is not triggered. When the terminal 101a of the power sources 101 is positive, the discharging current passing through the trigger diode DC1 is cut off by the diodes D21 and D22 and bypassed by the diode D24 so that the bidirectional triode thyristors TC1 and TC2 are not triggered.

When a signal is applied between, for example, the terminals 106a and 106, the circuits consisting of the terminal 106—the electrode T1'' of the thyristor TC3—the gate G'' thereof—the diode D19—the terminal 106a and the terminal 106—the electrode T1 of the thyristor TC1—the gate G thereof—the diode D17—the terminal 106a are respectively closed to make the thyristors TC3 and TC1 conductive and to short circuit the capacitor C3. As a result of this the trigger current supplied to the thyristors TC1 and TC2 for applying the rectified direct current is cut off to release the braking force being applied to the motor and the motor is immediately driven through the thyristor TC1. If the signal applied across the terminals 106a and 106 disappears the thyristors TC1 and TC3 are made nonconductive. Then the electric charge stored in the capacitor C3 is applied to the thyristors TC1 and TC2 respectively to make them conductive and to thereby apply braking force to the motor M.

In the case where a signal is applied between the terminals 106b and 106, the thyristor TC2, on the contrary, is made conductive to drive the motor M in the direction opposite to that when the thyristor TC1 is made conductive.

FIGS. 10 to 13 respectively show other examples of the present invention in which similar reference numerals to those in the foregoing examples represent similar components and their operations are substantially same with one another. For this reason detailed explanation thereof is omitted for the sake of simplicity.

Figure 10:
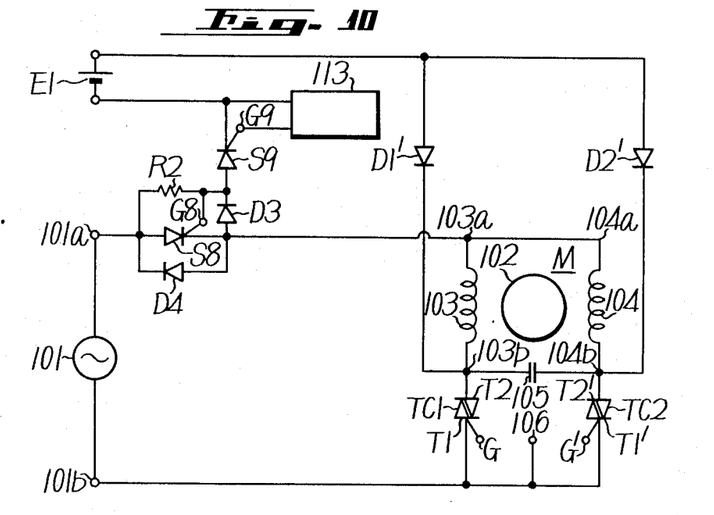

In the example depicted in FIG. 10, the terminal 101a of the power source 101 is connected to an anode of the reverse blocking triode thyristor S8. The cathode of the reverse blocking triode thyristor S8 is connected to the ends 103a and 104a of the windings 103 and 104 of the motor M respectively. Between the anode and cathode of the thyristor S8 a diode D4 is inserted in opposite polarities with respect to the thyristor S8. A resistor R2 is inserted between the anode and a gate G8 of the thyristor S8. A DC electric power source E1 is provided for supplying direct current to the windings of the motor M to apply braking force to the rotor 102 of the motor M. In this case the positive electrode of the DC electric power source E1 is connected to anodes of diodes D1' and D2' respectively and cathodes of the diodes D1' and D2' are respectively connected to the ends 103b and 104b of the windings 103 and 104 of the motor M. The other ends 103a and 104a of the windings 103 and 104 are together connected to an anode of a diode D3 the cathode of which is connected to an anode of a reverse blocking triode thyristor S9 and to the gate G8 of the reverse blocking triode thyristor S8 respectively. The cathode of the thyristor S9 is connected to the negative electrode of the DC power source E1. Between the cathode and a gate G9 of the thyristor S9 the braking signal generating circuit 113 is connected.

The operation of the circuit exemplified in FIG. 10 will be explained. When both of the bidirectional triode thyristors TC1 and TC2 are nonconductive, a signal is applied to the gate G9 of the reverse blocking triode thyristor S9 from the braking signal generating circuit 113 to make the thyristor S9 conductive. As a result of this the circuits consisting of the DC power source E1—the diode D1'—the winding 103—the diode D3—the thyristor S9—the power source E1 and the power source E1—the diode D2'—the winding 104—the diode D3—the thyristor S9—the power source E1 are respectively closed so that direct currents are passed through the windings 103 and 104 of the motor M respectively from the DC power source E1 to apply braking force to the motor M. Since the braking currents pass through the diode D3 respectively the gate G8 of the reverse blocking triode thyristor S8 is sufficiently reverse-biased due to the voltage drop of the diode D3 in the forward direction.

When a signal is fed between the terminal 106 and the gate G of the bidirectional triode thyristor TC1 for driving the motor M, the thyristor TC1 is made conductive. In this case when the terminal 101b of the AC electric power source 101 is positive, the reverse blocking triode thyristor S9 and the diode D3 are biased in the reverse direction through the closed circuit consisting of the power source 101—the bidirectional triode thyristor TC1—the diode D1'—the DC power source E1—the reverse blocking triode thyristor S9—the diode D3—the diode D4—the AC power source 101 to make the thyristor S9 nonconductive and then the DC braking current applied to the motor M is cut off. As soon as the thyristor TC1 becomes conductive, the braking signal generating circuit does not produce any signal to make the thyristor S9 conductive and the closed circuits feeding the braking current to the motor are changed to be opened. As a result of this, the bias voltage applied to the gate G8 of the reverse blocking triode thyristor S8 in the reverse direction disappears. In this case when the terminal 101a of the AC power source 101 is positive, a gate current is applied to the thyristor S8 through the resistor R2 to make the thyristor S8 conductive with the result that the AC current is fed to the motor to drive it. In the case where a signal is applied between the gate G of the bidirectional triode thyristor TC1 and the terminal 106 during the terminal 101a of the AC power source 101, the reverse blocking triode thyristor S9 S8 is not made conductive by the current passing through the resistor R2 and is held nonconductive because of the fact that the gate G8 of the thyristor S8 is sufficiently biased in the reverse direction by the braking current flowing through the diode D3. However, in this case the terminal 101a of the AC power source 101 is changed to be negative, namely the terminal 101b of the power source 101 is positive, the circuit feeding the braking current to the motor M is cut off and at the same time the reverse bias applied to the gate G8 of the thyristor S8 disappears to close the circuits feeding the AC current to the motor M and to drive it as explained above.

As apparent from the foregoing, the operation of the reverse blocking triode thyristor S8 is that the bidirectional triode thyristor TC1 or TC2 is prevented from passing an AC current through the thyristor TC1 or TC2 in the case where the thyristor TC1 or TC2 is made conductive during the time period when the terminal 101a of the power our source 101 is positive. If the anode and cathode of the thyristor S8 is short circuited, the circuit of the power source 101—the diode D3—the thyristor S9—the DC power source E1—the diode D1'—the thyristor TC113 the power source 101 is closed because of the fact that the thyristor S9 is held conductive when the thyristor TC1 is made conductive supposing the terminal 101a of the power source 101 being positive. As a result of this, a large amount of current flows through the closed circuit due to no load in the closed circuit to break the circuit elements. The thyristor S8 is employed for avoiding the large amount of current passing through the closed circuit.

When the signal applied between the gate G of the bidirectional triode thyristor TC1 and the terminal 106 disappears to make the thyristor TC1 nonconductive, a signal is fed to the gate G9 of the reverse blocking triode thyristor S9 to make it conductive with the result that the DC current is fed to the windings 103 and 104 of the motor M to stop it.

As in the foregoing examples of the present invention the circuits including the bidirectional triode thyristors TC1 and TC2 are symmetrical with each other with respect to the motor M so that when the thyristor TC2 is made conductive the motor M is driven in the opposite direction to that when the thyristor TC1 is conductive.

Figure 11:
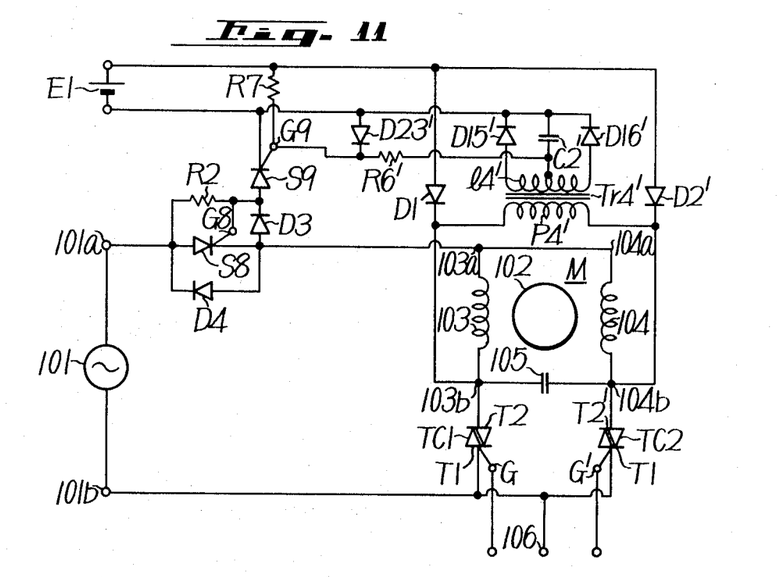

FIG. 11 is another example of the present invention in which similar numerals to those in FIG. 10 show similar components thereto and their operation is substantially same with each other. In this example a transformer Tr4' is provided a primary winding P4' of which is inserted between the ends 103b and 104b of the windings 103 and 104 of the motor M and both ends of a secondary winding l4' of which are respectively connected to the negative electrode of the DC power source E1 through diodes D15' and D16'. Between the connection point of the diodes D15', D16' and the secondary winding l4' a capacitor C2' is inserted. The connection point of the capacitor C2' and the secondary winding l4' is connected to the gate G9 of the reverse blocking triode thyristor S9 through a resistor R6'. A resistor R7 is inserted between the gate G9 and the positive electrode of the DC power source E1 and a diode D23' is inserted between the gate G9 and the negative electrode of the DC power source E1. The other elements are connected as in the example shown in FIG. 10.

With the circuit shown in FIG. 11, when the bidirectional triode thyristor TC1 or TC2 is made conductive the AC voltage is produced across the capacitor 105. As a result of this the DC voltage is obtained from the output terminals of the rectifying circuit consisting of the secondary winding l4' of the transformer Tr4'. the diodes D15', D16' and the capacitor C2'. Due to thus produced DC voltage DC current passes through the circuit including the rectifying circuit, the diode D23' and the resistor R6' so that the gate G9 of the thyristor S9 is sufficiently biased in the reverse direction due to the voltage drop of the diode D23' in the forward direction to hold the thyristor S9 nonconductive positively. When both of the bidirectional triode thyristors TC1 and TC2 are nonconductive no AC voltage is produced across the capacitor 105 to produce no DC voltage in the output side of the transformer Tr4'. Accordingly the reverse bias applied to the gate G9 of the thyristor S9 due to the diode D23' is released to feed the DC current from the DC power source E1 to the gate G9 of the thyristor S9 through the resistor R7 with the result that the thyristor S9 is mad made conductive.

The circuits, consisting of the transformer Tr4', the diodes D15', D16', the capacitor C2', and the diode D23' for applying a bias voltage to the gate G9 of the thyristor S9 and including the resistor R6', the DC power source E1 and the resistor R7, form a practical embodiment of the braking signal generating circuit 113 depicted in FIG. 10.

Since the operation of this example for driving or stopping the rotor 102 of the motor M is substantially same to that of the example shown in FIG. 10, it is omitted for the sake of simplicity.

Figure 12:
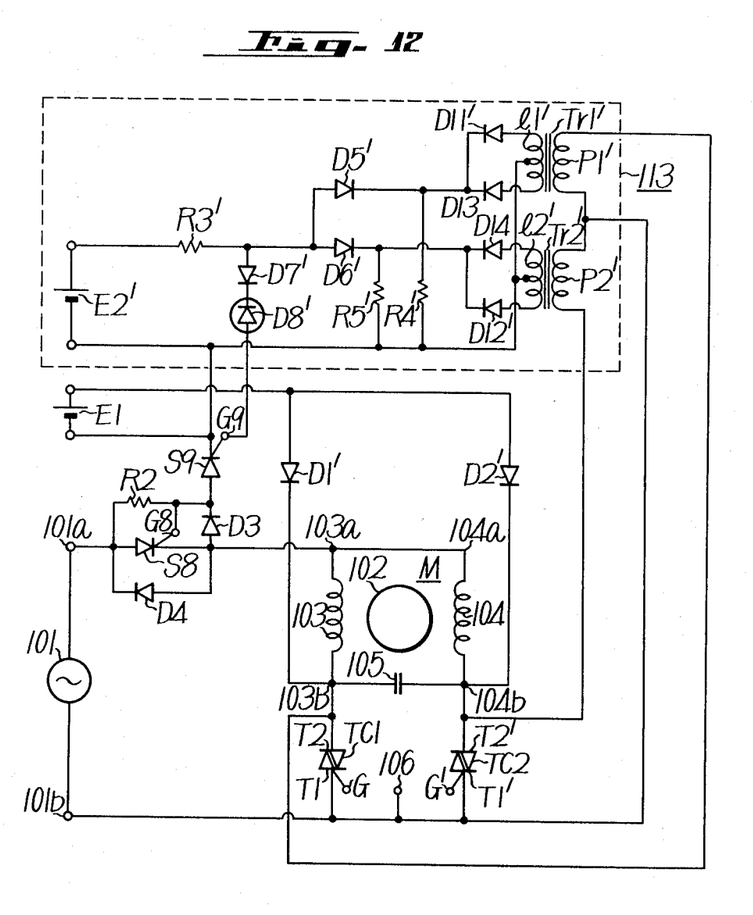

FIG. 12 shows still another example of the present invention in which similar reference numerals to those of FIGS. 10 and 11 designate similar components. In FIG. 12, he part surrounded by the dotted line represents another example of the braking signal generating circuit 113. That is, the braking signal generating circuit 113 includes transformers Tr1' and Tr2'. Primary windings P1' and P2' of the transformers Tr1' and Tr2' are connected in series and inserted between the ends 103b and 104b of the windings 103 and 104 of the motor M and the connection point of the primary windings P1' and P2' is connected to the connection point of the electrodes T1 and T1' of the bidirectional triode thyristors TC1 and TC2. Other circuit elements shown in the dotted line block will be explained in connection with the operation of the example of FIG. 12.

When the bidirectional triode thyristors TC1 and TC2 are both in nonconductive condition, voltage is produced across the both ends of each of the thyristors TC1 and TC2. As a result of this at the output side of each of the transformers Tr1' and Tr2' rectified output is produced to make diodes D5' and D6' nonconductive respectively, the anodes of the diodes D5' and D6' being connected together to a positive electrode of a DC electric power source E2' through a resistor R3', the cathodes of the diodes D5' and D6' being connected to the output circuits of the transformers Tr1' and Tr2' respectively. In this example, the output circuit of the transformer Tr1' is composed of the secondary winding l' of the transformer Tr1' and diodes D11' and D13 a the anodes of which are respectively connected to the ends of the secondary winding l1' and the cathodes of which are connected together to the cathode of the diode D5' and the output circuit of the transformer Tr2' consists of the secondary winding l2' of the transformer Tr2' and diodes D12' and D14 the anodes of which are respectively connected to the ends of the secondary winding l2' and the cathodes of which are connected together to the cathode of the diode D6', the middle points of the secondary windings being connected with each other and connected to the negative terminal to of the DC power source E2'. Also in this example, a resistor R4' is inserted between the cathode of the diode D5' and the negative electrode of the DC power source E2', a resistor R5' is inserted between the cathode of the diode D6' and the negative electrode of the DC power source E2' and a series circuit of diode D7' and a Zener diode D8' is inserted between the positive electrode of the DC power source E2' and the gate G9 of the reverse blocking triode thyristor S9 in which series circuit the cathode of the diode D7' is connected to the cathode of the Zener diode D8'.

When the diodes D5' and D6' are made nonconductive current is fed to the gate G9 from the DC power source E2' to make the thyristor S9 conductive through the resistor R3', the diode D7' and the Zener diode D8' which is made conductive by the DC power source E2'.

When either one of the bidirectional triode thyristors TC1 and TC2 is made conductive, since no output voltage is obtained at the output side of the transformer Tr1' or Tr2', current is fed to the closed circuit of the DC power source E2'—the resistor R3'—the diode D5'—the resistor R4'—the DC power source E2' or the closed circuit of the DC power source E2'—the resistor R3'—the diode D6'—the resistor R5'—the DC power source E2' to lower the anode potential of the diode D7'. The anode potential of the diode D7' in this case is substantially same to that of the DC power source E2' in this case is substantially same to that of the divided by the resistors R3' and R4' or R3' and R5' and cannot make the zener diode D8' conductive so that the reverse blocking diode S9 is maintained to be nonconductive.

With the circuit exemplified in FIG. 12, the motor M can be driven instantaneously and can be immediately subjected to the braking force to stop it at once, as in the example shown in FIG. 10.

Figure 13:
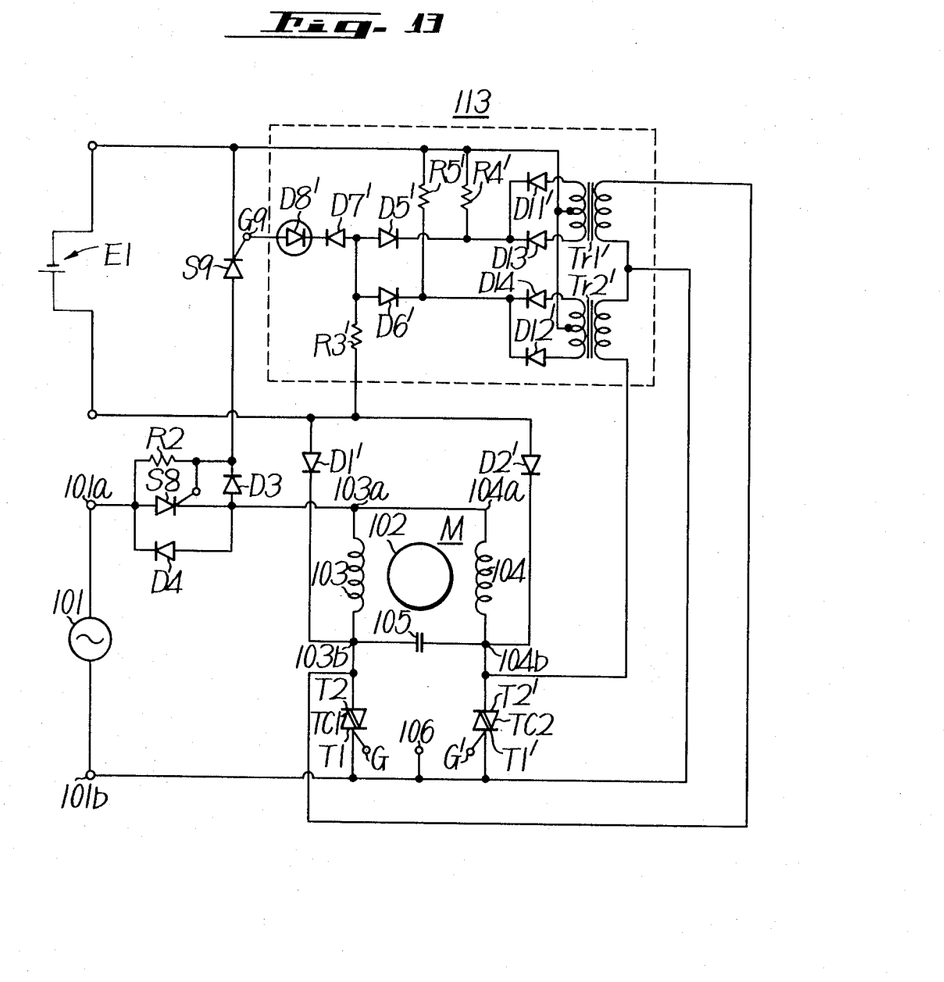

FIG. 13 shows still a further example of the present invention. This example is substantially same to that illustrated in FIG. 12 except that in this example the DC power source E1 for feeding the braking DC current to the motor M is used as the DC power source E2' of the braking signal generating circuit 113 in the example shown in FIG. 12.

In the examples illustrated in FIGS. 11 to 13, both of the bidirectional triode thyristors TC1 and TC2 are not made conductive at the same time. However, if both the thyristors TC1 and TC2 are made conductive by some accidental factors, AC current can pass through the thyristors TC1 and TC2 respectively. In such a case, with the circuit shown in FIG. 11, the reverse blocking triode thyristor S8 is made conductive when the terminal 101a of the AC power source 101 is positive and no reverse bias is applied to the gate G9 of the reverse blocking triode thyristor S9 due to the fact that no output is obtained at the output side of the transformer Tr4' connected between the both electrodes of the capacitor 105 to thereby make the thyristor S9 conductive by the DC current passing through the resistor R7 from the DC power source E1. As a result of this the circuits consisting of the AC power source 101—the thyristor S8—the diode D3—the thyristor S9—the DC power source E1—the diode D1'—the thyristor TC1—the AC power source 101 and the power source 101—the thyristor S8—the diode D3—the thyristor S9—the DC power source E1—the diode D2'—the thyristor TC2—the AC power source 101 are respectively closed. In the case where such closed circuits are formed there occurs a hazard that a great amount of current passes through the closed circuits to damage the circuit elements such as diode and thyristors included therein.

In the circuits illustrated in Figures 12 and 13, even if both of the thyristors TC1 and TC2 are made conductive at the same time, the anode potential of the diode D7' does not reach a potential to make the Zener diode D8' conductive so that no current is fed to the gate G9 of the thyristor S9 to make it conductive because of the fact that no output is obtained at the output circuits of the transformers Tr1' and Tr2'. Accordingly, since no closed circuits such as formed in the circuit exemplified in Figure 11 are formed in the examples shown in FIGS. 12 and 13, the circuits of FIGS. 12 and 13 are operated more safely as compared with that of FIG. 11.

According to the present invention, especially the examples shown in FIGS. 10 to 13, the following effects can be afforded:

1. No resistor is provided for limiting the current applied to the motor to stop it. If the current for applying the braking force to the motor is obtained by rectifying the AC current from the AC power source 101 without providing a DC electric power source, as in the prior art, it is generally necessary that a limiting resistor is provided for preventing a large amount of current from passing through the motor windings. Such limiting resistor causes power consumption and generation of heat which has harmful influence upon the circuit.

In the present invention, since the resistor is not provided the defects caused by the resistor do not occur.

2. No saturation occurs in the transformer used in the present invention.

In general, when braking current supplying source is made by rectifying an AC power source for driving the AC motor, half-waves of the AC power source are necessarily utilized, which causes saturation of a transformer used as the braking current supplying source. For avoiding the saturation it is necessary to employ a transformer of large capacity.

According to the present invention, a relatively small capacity transformer will be sufficient because there occurs no saturation in the transformer.

3. The braking effect of the present invention is excellent.

The braking force attained by means of half-wave rippled current causes time lag until the braking force is applied to the motor at the time when the signal is given to the apparatus to apply the braking force thereto.

The circuit according to the present invention, the braking force is immediately applied to the motor when the signal is supplied.

Figure 14:
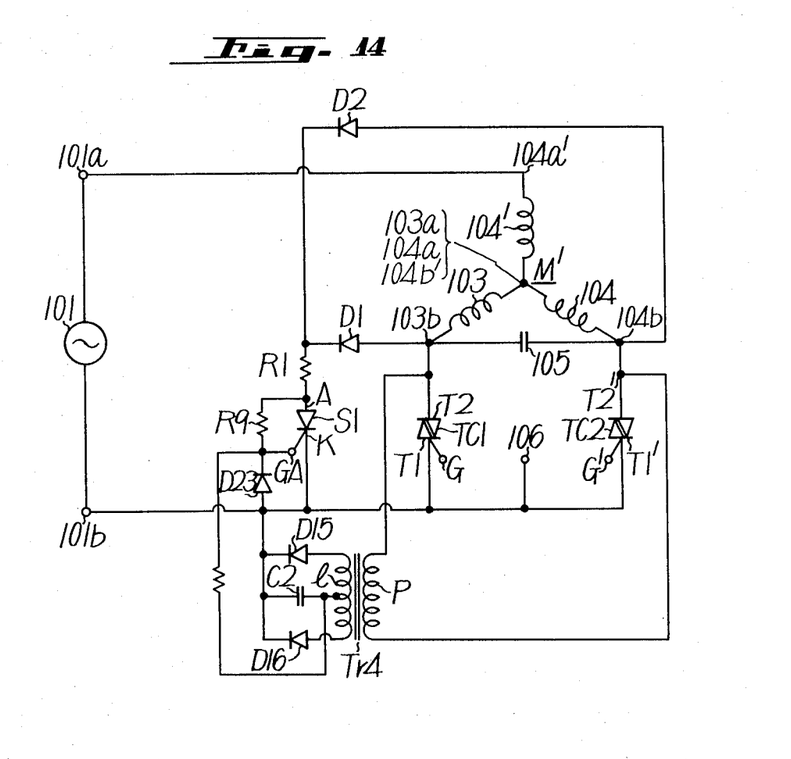

FIG. 14 shows still a further example of the present invention in which one example of the present invention is applied to a three-phase motor M to control the same. That is, the motor M shown in FIG. 4 is replaced by the three-phase motor M. In this case the capacitor 105 is inserted between the ends 103b and 104b, the other ends of the windings 103a and 104a are connected together, one end 104b' of another winding 104' is connected to the connection point of the windings 103 and 104 and the other end 104a' of the winding 104' is connected to the terminal 101a of the AC power source 101. The other components of this example are similar to those of FIG. 4 and their connection and operation are substantially same to those of FIG. 4 so that explanation thereof is deleted.

The example shown in FIG. 14 is the case where the two-phase AC motor M in FIG. 4 is replaced with the three-phase AC motor M but it will be understood that the two-phase AC motor in each example of the present invention can be replaced with a three-phase AC motor to control the motor.

Figure 15:
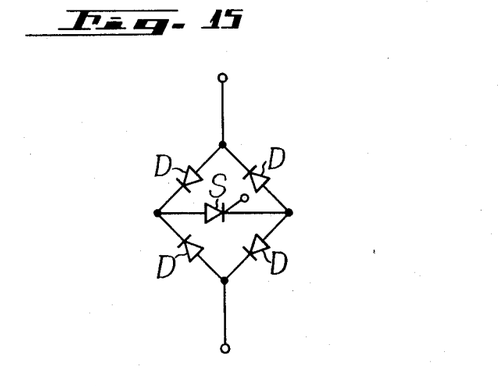
FIG. 15 is a connection diagram showing one part employed in the present invention.

FIG. 15 is one example of the circuit elements which can be used as the bidirectional triode thyristor.

The circuit element shown in the figure consists of four diodes D and a reverse blocking triode thyristor S connected as shown in FIG. 15.

While preferred embodiments are described and shown, it will be apparent to those skilled in the art that many changes and modifications may be made without departing from the present invention in its broader aspect. We therefore intend the appended claims to cover all such changes and modifications which fall within the true spirit and scope of the present invention.

We claim:

1. A controlling circuit for an AC motor comprising an AC two-phase motor driven by a single-phase AC electric power source having two windings and a capacitor inserted between first ends of said two windings, the other ends of said two windings being connected together and to one terminal of said AC electric power source, two AC controlling elements, respectively, connected between both terminals of said capacitor and the other terminal of said AC electric power source, two diodes connected between the terminals of said capacitor in reverse polarity, a switching element connected between the connection point of said two reverse-polarity diodes and the end of said AC power source to which said two AC controlling elements are connected, a first means for detecting a condition when said two AC controlling elements are both nonconductive, and second means for making said switching element conductive when said two AC controlling elements are both nonconductive, whereby one of said two AC controlling elements and said switching element are not made conductive at the same time so as to prevent DC braking current and AC driving current to be supplied to said two windings at the same time.

2. A controlling circuit for an AC motor as claimed in claim 1, wherein said first and second means are composed of a transformer having a primary winding which is connected between the terminals of said capacitor and having a secondary winding which is connected to a gate and a cathode of said switching element respectively through a rectifying circuit, said switching element made conductive by said AC power source when said motor is stopped, whereby when at least one of said two AC controlling elements is conductive said switching element is nonconductive by reverse bias from an output of said transformer.

3. A controlling circuit for an AC motor as claimed in claim 1, wherein said first means comprises two transformers and said second means is an AND gate circuit which is inserted between said transformers and said switching element, a primary winding of each of said two transformers connected across two terminals of said two AC controlling elements, whereby when both of said two AC controlling elements are nonconductive said switching element is made conductive to apply braking force to said motor.

4. A controlling circuit for an AC motor as claimed in claim 1, wherein said first means is an OR circuit consisting of a plurality of diodes which are inserted into the gate circuit of said two AC controlling elements and said second means is a control circuit controlled by said OR circuit for generating a signal to make said switching element nonconductive when either of said two AC controlling elements is conductive.

5. A controlling circuit for an AC motor as claimed in claim 1, wherein said two diodes are inserted between the gates of said two AC controlling elements and said second means, whereby said two AC controlling elements are made conductive in one direction when no gate signal is applied to the gates of said two AC controlling elements to apply braking force to said motor.

6. A controlling circuit for an AC motor comprising an AC motor driven by a single-phase AC electric power source having two windings and a capacitor inserted between first ends of said two windings, the other ends of said two windings connected together and to one terminal of said AC electric power source through a circuit means consisting of a diode and a blocking thyristor connected in reverse parallel, two AC controlling elements respectively connected between both terminals of said capacitor and the other terminal of said AC electric power source, two diodes connected between both terminals of said capacitor in reverse polarity, a DC electric power source for supplying DC current to said windings, one terminal of said DC electric power source connected to the connection point of said two reversely connected diodes, a switching element one end of which is connected to the other terminals of said DC electric power source and the other end of which is connected to the connection point of said two windings and said circuit means through a diode which is inserted between the gate and the cathode of said reverse blocking thyristor, a first means for detecting a condition when said two AC controlling elements are both nonconductive, and a second means for making said switching element conductive when said two AC controlling elements are both nonconductive.

7. A controlling circuit for an AC motor as claimed in claim 6, wherein said first means is a transformer having a primary winding which is inserted between both terminals of said capacitor and a secondary winding which is connected between one electrode and a controlling electrode of said switching element through rectifying elements, said switching element rendered conductive by said DC electric power source and rendered nonconductive by an output of said transformer when either one of said AC controlling elements is conductive.

8. A controlling circuit for an AC motor as claimed in claim 6, wherein said first means consists of two transformers and said second means is an AND gate circuit inserted between said transformers, a primary winding of each of said two transformers being inserted between two terminals of each of said two AC controlling elements, whereby when there are generated outputs from said transformers said switching element is made conductive by currents supplied from said output of said transformers through said AND gate circuit.